(12) United States Patent
Doglioni Majer

(10) Patent No.: US 10,966,567 B2
(45) Date of Patent: Apr. 6, 2021

(54) BEVERAGE PREPARATION APPARATUS AND METHOD

(71) Applicant: TUTTOESPRESSO S.r.l., Milan (IT)

(72) Inventor: Luca Doglioni Majer, Carate Urio (IT)

(73) Assignee: TUTTOESPRESSO S.r.l., Milan (IT)

( * ) Notice: Subject to any disclaimer, the term of this patent is extended or adjusted under 35 U.S.C. 154(b) by 497 days.

(21) Appl. No.: 15/508,777

(22) PCT Filed: Dec. 22, 2014

(86) PCT No.: PCT/EP2014/079033
§ 371 (c)(1),
(2) Date: Mar. 3, 2017

(87) PCT Pub. No.: WO2016/034255
PCT Pub. Date: Mar. 10, 2016

(65) Prior Publication Data
US 2017/0273502 A1   Sep. 28, 2017

(30) Foreign Application Priority Data

Sep. 5, 2014  (WO) ................. PCT/EP2014/069017

(51) Int. Cl.
*A47J 31/54* (2006.01)
*A47J 31/56* (2006.01)
(Continued)

(52) U.S. Cl.
CPC ........... *A47J 31/545* (2013.01); *A47J 31/469* (2018.08); *A47J 31/5251* (2018.08);
(Continued)

(58) Field of Classification Search
CPC ........ A47J 31/56; A47J 31/545; A47J 31/002; A47J 31/46; A47J 31/469; A47J 31/542;
(Continued)

(56) References Cited

U.S. PATENT DOCUMENTS 5,858,437 A * 1/1999 Anson ................... A47J 31/002
426/431
6,459,854 B1   10/2002 Yoakim et al.
(Continued)

FOREIGN PATENT DOCUMENTS

EP         1 634 520 A1     3/2006
WO      WO 01/54551 A1     8/2001
(Continued)

OTHER PUBLICATIONS

International Search Report dated Jul. 14, 2015 in PCT/EP2014/079033 filed Dec. 22, 2014.
(Continued)

*Primary Examiner* — Ibrahime A Abraham
*Assistant Examiner* — Chris Q Liu
(74) *Attorney, Agent, or Firm* — Silvia Salvadori

(57) ABSTRACT

A beverage preparation apparatus and method are provided, the apparatus including a brewing chamber, at least one pump configured to supply a diluent to the brewing chamber, two heaters configured to heat the diluent, at least one heater of the two heaters being a pipe heater, a controller configured to independently supply power to one or both of the heaters as a function of a flow rate and of a temperature of the diluent.

8 Claims, 5 Drawing Sheets

(51) Int. Cl.
*A47J 31/46* (2006.01)
*A47J 31/52* (2006.01)

(52) U.S. Cl.
CPC ....... *A47J 31/5253* (2018.08); *A47J 31/5255* (2018.08); *A47J 31/56* (2013.01)

(58) Field of Classification Search
CPC ...... A47J 31/36; A47J 31/3604; A47J 31/407; A47J 31/465; A47J 31/467; A47J 31/54; A47J 31/00; A47J 31/0573; A47J 31/24; A47J 31/30; A47J 31/3671; A47J 31/368; A47J 31/401; A47J 31/402; A47J 31/404; A47J 31/41; A47J 31/42; A47J 31/44; A47J 31/4403; A47J 31/4467; A47J 31/4485; A47J 31/4489; A47J 31/52; A47J 31/525; A47J 31/5251; A47J 31/5253; A47J 31/5255; A47J 31/60
USPC ....... 392/485, 442, 465, 479, 458, 467, 480, 392/481, 491; 99/280, 281, 300, 283, 99/288, 293, 275, 282, 286, 289 R, 290, 99/299, 302 R, 307, 323.3; 219/481, 497, 219/430, 432, 490, 494, 505, 535, 552; 426/431, 433
See application file for complete search history.

(56) References Cited

U.S. PATENT DOCUMENTS

| | | | | |
|---|---|---|---|---|
| 7,907,835 | B2* | 3/2011 | Boussemart | F24H 9/2028 |
| | | | | 392/479 |
| 8,739,687 | B1* | 6/2014 | Tacklind | A47J 31/42 |
| | | | | 99/280 |
| 2006/0096465 | A1 | 5/2006 | Hu et al. | |
| 2008/0008461 | A1 | 1/2008 | Hu et al. | |
| 2008/0273868 | A1* | 11/2008 | Boussemart | F24H 9/2028 |
| | | | | 392/479 |
| 2011/0127255 | A1 | 6/2011 | Boussemart et al. | |
| 2011/0259203 | A1* | 10/2011 | Mograbi | A47J 31/46 |
| | | | | 99/288 |
| 2013/0129885 | A1* | 5/2013 | Doglioni Majer | A47J 31/002 |
| | | | | 426/431 |

FOREIGN PATENT DOCUMENTS

| | | |
|---|---|---|
| WO | WO 2006/050856 A1 | 5/2006 |
| WO | WO 2011/151703 A2 | 12/2011 |
| WO | WO 2011/151703 A3 | 12/2011 |

OTHER PUBLICATIONS

Written Opinion dated Jul. 14, 2015 in PCT/EP2014/079033 filed Dec. 22, 2014.

* cited by examiner

BEVERAGE PREPARATION APPARATUS AND METHOD

FIELD OF THE INVENTION

The present invention relates to a process and an apparatus for beverage preparation. In particular, the invention relates to an apparatus and a process for hot beverages such as coffee, herbal infusions, cocoa-based granulates or liquid concentrates, dairy and non-dairy granulates or liquid concentrates and the likes; for clarity's sake, the beverage can be obtained from a first product that is brewed, percolated or reconstituted with a second product, such as water or other diluent preferably in liquid form, said first product being drawn from a fresh ingredient, such as roasted and ground coffee or minced tea, or from a soluble product, or a liquid concentrate, that are dissolved or diluted in water or other diluent liquid. The diluent is at least in part heated to prepare the beverage.

The present invention relates to means for heating water or a diluent in a beverage dispensing apparatus, i.e. a beverage preparation apparatus, and a relevant beverage preparation method, for use at home or out of home, suitable for use with solid or liquid ingredient aimed at being used as foodstuff for human consumption, in a finished, meaning ready-to-use, beverage.

BACKGROUND ART

The teachings of the present application apply to dispensing machines for beverage preparation, wherein a diluent liquid, usually water, is heated and used to prepare the beverage using one or more ingredients. In the present application a diluent liquid can also perform an extraction task, as is known in the art.

The ingredients for beverage preparation are usually provided in a brewing chamber of the beverage preparation apparatus. An exemplary brewing chamber is a single use container, for example a capsule, that is initially inserted in the brewing machine and is eventually removed from it after the beverage has been dispensed. Another exemplary brewing chamber includes a cylinder and at least one piston; this type of brewing chambers is generally found in machines using ingredients stored in bulk or in loose form, such as food-service or so-called "Horeca" machines, vending machines or "fully automatic" bean-to-cup coffee machines for home use.

Preferably, the present invention is used in those machines that provide finished gourmet drinks, such as cappuccino, or regular coffee, hot soups, high-speed delivered teas, etc, wherein one or more diluent liquid can be for example added without passing through the brewing chamber. For instance when a cappuccino has to be prepared, a first diluent (hot water) is injected into the brewing chamber to extract the ingredient, i.e. coffee, and another diluent, i.e. milk, is added without passing inside the brewing chamber. In the following description, water will be used to refer also to diluents in general.

Water, or other diluent, passing through the brewing chamber is preferably pressurized to enhance extraction of the aromas and other compounds from the ingredients to form the beverage as well as to speed up the brewing process and provide less downtime to the user. Because the quality of the beverage largely depends from the extraction process, improvements to the extraction processes have been actively researched for many years, as they still are. However, such research has resulted in an increasing "specialization" of the extraction processes and/or of the hardware used for it; as an example, the engineering of capsules has reached a level in which the smallest details are patented. On the other side, technology of the standard brewing chamber (cylinder and piston) has not progressed so dramatically.

A further problem with known machines is that of energy saving. Known systems and procedures for energy savings act on the temperature of the water in the heating means of the apparatus when the apparatus is not dispensing a beverage. As a result, presently known techniques tend to increase the amount of time the user has to wait before the beverage is dispensed.

There is therefore the need to increase the overall quality of the finished beverage independently on the type of beverage and there is the need to obtain a dispensing unit that reduces the energy consumption, that ensures the correct dissolution in water of the dry extracts, or dilution of liquid concentrates, or the extraction of the soluble solids from the different ingredient foodstuffs utilised in the beverage preparation apparatus, and that in general provides improved quality to the beverage and an enhanced organoleptic experience to the consumer of the finished product in particular with respect to the quality of the prepared beverage.

SUMMARY OF THE INVENTION

An aim of the present invention is to solve the above problems. It is an object of the present invention to mitigate or to obviate to the disadvantages or shortcomings of the beverage production machines and methods known in the art.

In particular, the present invention discloses an apparatus and a method to provide a wider range and enhanced quality of drinks.

According to an exemplary embodiment, the problems are solved by the apparatus and by the method of the present invention, wherein two heaters (i.e. two heating means) are provided.

At least one of the two heaters is a pipe heater for heating a diluent liquid flowing there through, as disclosed herein below, to increase flexibility and control of the heating of the diluent, and to reduce the time required for dispensing a beverage, independently on the volume of the beverage.

In a preferred embodiment of the invention, at least two heating means (heaters) are provided connected in series. The two heating means are intended for heating a diluent liquid flowing therethrough. They are independently operated by a controller configured to independently supply power to the separate heating means; in other words, the heating means can be switched on and off separately, as well as they may be powered at different and variable levels, so as to provide different heating effects to the water or diluent flowing through them.

According to an aspect of the invention the above mentioned heating means are separate pipe heaters and/or separate heating portions of at least one pipe heater; namely, the at least two heating means may be obtained by one pipe heater having two or more distinct and electrically separate heating sections. The at least two heating means may also comprise two or more separate pipe heaters. A combination of these embodiments is possible.

According to a possible further embodiment, the problems are solved by the apparatus and by the method of the present invention, wherein at least one pipe heater for the water or other diluent or ingredient is present, and wherein the water or other diluent that exits the pipe heater and that is used during the beverage preparation step is provided at least at two different temperatures. The increase in temperature of the water is carried out in a same heating means, i.e. the temperature of the heating means is increased and at the same time the temperature of the water is increased. The water flows in a single heating means or in two or more heating means connected in series, i.e. so that the water leaving a first heating means enters the following heating means. Preferably, the initial temperature of the water is lower than a successive temperature of the water.

According to a further possible embodiment, the problems are solved by the apparatus and method wherein two diluent liquid sources are provided to allow the preparation of a wider range of drinks in an apparatus having at least one pipe heater.

Beverage preparation machines of the type object of the present application require heating means (heaters) for the diluent, generally water. For the purpose of this application by using the word "traditional heater" we shall refer to heating means used in beverage preparation apparatus to heat a brewing liquid such as for example a boiler, e.g. of the type comprising a vessel for the diluent liquid wherein the liquid is heated by electric resistances; flash heaters (see e.g. GB1177421 and EP1020152—Unilever) and induction heaters (see e.g. WO2011160975—Unilever) are also within the scope of the invention as possible "traditional" heating means.

By using the word "pipe heater", for the purpose of this application, we shall refer to so-called "speed heaters" or other devices using the so-called "heating films", which can either be thick films, or preferably thin films. Heating films are known in the art and may be preferably composed of coatings made of chemical compounds including different electrically conductive materials, such as metal oxides, or carbon based material (including the so-called CNT, i.e. carbon nanotube), in different proprietary or commonly available mixes. In general, these are of the known types such as in CN 202692439 U to Yang Ningen et al. CNT are commonly applied as thin films on rectilinear tubes of quartz or glass or similar insulating material; thick films are also used with a metal pipe in the form of a serpentine such as that disclosed in WO2007/008075 in the name of Ferro Techniek (NL) and commercially available from the said company. A layer of electrically insulating material is provided between the thick layer of resistive material and the metal pipe (straight, spiral or serpentine shaped). The resistive material is applied on the device as a single track or as several tracks electrically connected to each other.

Albeit a technology available since the early 1990's, see e.g. application GB2322273, these type of heaters have not reached a standardized nomenclature, nor widespread use in the field of beverage preparation. For the purpose of this application we shall therefore refer to "pipe heaters" meaning hollow pipes, usually straight but also available in other shapes, such as U or spiral or serpentine, made of materials such as quartz glass, or ceramics, or metal, and bearing an adhesive, or coated or otherwise assembled heat-transmitting film, or compound used as the electrically-transmitting coating material on the outer surface. Water or other liquids are passed inside the pipe and are heated through the pipe material.

Due to different nomenclature, these heaters may be known as "pipe heater" or referred also to as "cigar" or hollow heaters, tubes, film heaters (either thin and thick films) et cetera. Their common feature is that they are ultra-fast heating devices that can reach 100 degrees C. in fractions of one second, and that they bear a very limited mass. The speed of heat transmission to the diluent is therefore greatly reduced and optimized with respect to the heating process in a traditional heater. Pipe heaters with a layer of CNT are a preferred heating means for the purpose of the present application.

A fluid, and in particular a diluent liquid, is passed through the pipe heaters so that the heat generated by the electrically conductive material can be transferred to the liquid passing therethrough. The liquid means may, in contact with the heated pipe, turn into gaseous form; therefore, for the purpose of the present application, the diluent provided by the pipe heater may also be in the form of a vapor, particularly as steam. As known in the art, electrical power, also indicated in the following as power, is supplied to the pipe heaters, usually by means of two or more electrical terminals electrically coupled to the electrical conductor material.

Known heating and dispensing systems also include systems such as in WO2006050856, where temperatures generated by one heater can be modulated, or such as in WO2011151703 by the Applicant where different heat sources may be used in conjunction to prepare the finished drink. It is known that different diluents' temperatures may control the final quality of the drink, including its froth quality, and create a palette of different beverage tastes.

According to a first embodiment of the invention, the beverage preparation apparatus and the relative method allow to drastically reduce the power consumption via use of at least two heating means, wherein at least one of the heating means is a pipe heater for heating a diluent liquid flowing therethrough, so that the improved flexibility derived from the use of two heat sources is available even in case of limitations in the power supply.

According to this embodiment, the beverage preparation apparatus comprises a brewing chamber for containing at least one ingredient for the beverage preparation, at least one pump to supply a diluent liquid from at least one diluent source at least two heating means for heating a diluent liquid, characterized in that said heating means including at least one pipe heater for heating said diluent, arranged upstream of said brewing chamber, said heating means including said at least one pipe heater being independently controlled by a controller configured to independently supply power to said heating means including said at least one pipe heater, to selectively activate or deactivate them.

According to an aspect, the heating means comprises two or more heating sections of at least one pipe heater, and each heating section is independently controllable by the controller of the beverage preparation apparatus. According to another aspect, the two or more heating means are formed by two or more separate pipe heaters, preferably the two or more separate pipe heaters are arranged in series.

In other words, according to this embodiment, the beverage preparation apparatus comprises two or more heating means which are controlled independently, one with respect to another. In other words, each heating means can be controlled individually. The heating means comprises at least one pipe heater comprising two or more heating sections, which can be formed by two or more portions of heating film applied on the surface of the pipe heater and whose power supply is separately controlled. According to another embodiment, two or more pipe heaters are provided, preferably in series, and are controlled independently one to another by the controller. It has to be understood that also the embodiment wherein two or more pipe heaters are provided and, one or more of these pipe heaters, comprises two or more heating sections can be provided.

The presence of two or more heating means, independently controlled by means of at least one controller, allows to increase flexibility of the beverage preparation apparatus and of the relative method of preparing a beverage by means of the apparatus.

The independent control of the heating means allow to obtain a fine adjustment of the temperature of the diluent liquid used to prepare the beverage.

According to an advantageous aspect the controller is configured to supply power to the heating means including at least one pipe heater depending on the diluent liquid flow rate passing through said heating means.

In fact, on the basis of the power supplied to pipe heater, or to at least one heating section of the heater, in a predetermined amount of time, for a predetermined flow rate of the diluent liquid passing there through to obtain a desired temperature, the time of activation and/or the power supplied to one or more pipe heaters and/or two or more heating sections of at least one pipe heaters, can be modified. In other words, the power or the voltage fed to the thin (or thick) film sections can be changed from zero to a maximum; in a simple embodiment, the heating sections work on a switch-on, switch-off basis.

In particular, the pipe heater and/or the two or more heating sections of at least one pipe heater can be activated by the controller to obtain the at least one desired temperature value of the diluent liquid.

Further features of this embodiment are disclosed in the relative dependent claims.

According to an exemplary embodiment, a first heater is connected to the brewing chamber and the second heater is connected to beverage dispensing means downstream to brewing chamber or to said brewing chamber or to both said dispensing means and said brewing chamber.

According to an advantageous aspect at least one of the two heaters is a pipe heater for heating a diluent liquid flowing there through. More in detail, according to different possible embodiments, one of the two heaters is a pipe heater for heating a diluent liquid flowing there through and the other heater is a traditional heater, or both heaters are pipe heaters for heating a diluent liquid flowing therethrough.

In an embodiment of the invention the controller supplies power to one of said heaters, or to both said two heaters (or to all the heaters if more than two) to set the temperature of the diluent exiting one of said heaters or exiting both (or all) said heaters, on a constant value and/or on at least two different values during the beverage preparation cycle.

The expression "controller supplies power" as used in the present application means that the controller operates (controls) a suitable power supply device to provide power to the heater, either of the traditional type and/or a pipe heater. Such controlling devices are available to the skilled in the art, e.g. via a Triac-equipped so-called "power-board" allowing for minute control of the power supply to the heater(s).

The method for preparing a beverage comprises the step of providing at least one ingredient inside a brewing chamber, the step of activating at least one pump to supply a diluent liquid from a diluent source to said brewing chamber, preferably said diluent liquid being heated in said first heater connected to the brewing chamber, the step of supplying diluent from a second heater to means for dispensing the beverage leaving the brewing chamber or to said brewing chamber or to both, the step of supplying power to one of said heaters, or to both said two heaters, to independently set the temperature of the diluent exiting one of said heaters or exiting both said heaters, on a constant value and/or on at least two different values.

The brewing chamber is preferably closed so as to be pressurized by feeding the diluent in said brewing chamber. The pressurizing steps are known in the art and can include a variation or change of the pressure of the chamber.

It has to be noted that the temperature control of one heater can be different from the temperature control of the second heater. More in detail, the first heater can be set on a constant temperature value, or on at least two different temperature values and the second heater can be set on a constant temperature value, or on at least two different temperature values, equal or different from the value of the first heater. In one embodiment, there is provided one traditional heater suitable to maintain a first water temperature and a second heating means that is a pipe heater, the pipe heater is connected in series to the traditional heater to receive pre-heated water from it. The pipe heater is located between the traditional heater and the brewing chamber. In case of a restriction or of limitations in the power supply, such as limited rating in a traditional socket used by home-appliances, the controller can deactivate the first heater and activate the pipe heater only; the pipe heater will receive water at least in part heated from the first heater.

It has to be understood that the constant value, or the at least one temperature value, on which a heater can be set comprises a suitable tolerance range available to a skilled person in the art.

The apparatus comprises a brewing chamber for containing at least one ingredient for the beverage preparation, either in pre-packaged or loose form, at least one pump to supply a diluent liquid, preferably water, from diluent source (for example comprising a diluent tank or a diluent supply line) to the brewing chamber and at least one pipe heater for heating a diluent liquid flowing therethrough, arranged upstream of said brewing chamber. The apparatus further comprises a controller for supplying power to the pipe heater, to activate it, wherein said controller supplies power to the pipe heater to set the temperature of the diluent exiting the pipe heater on at least two different values during the beverage preparation cycle.

The modification of the temperature value during the beverage preparation cycle allows to enhance the quality of the produced beverage. The temperature modification in combination with the use of pipe heaters, i.e. heaters allowing a quick heat of the diluent, allows to fine adjust in very accurate and quick manner the desired temperature of the diluent. If necessary, there will be provided a delay in starting the pump and feeding cold water to the brewing chamber. Slight delays necessary for reaching the new, different temperature level may require to reduce the flow-rate of the diluent, depending on the desired end-quality result. In other words, if the total volume of the beverage is relatively small, e.g. in a ristretto or in an espresso, the flow rate of cold water will be reduced in the first part of the beverage dispensing process to avoid too much water at low temperature reaching the beverage container. The flow rate is resumed once the temperature of the heater has reached the value required to provide a final beverage having the selected temperature. In general, a pump stop can be carried out when the brewing apparatus is operated to dispense a beverage, should the diluent temperature be too low, to avoid obtaining a final beverage having a too low temperature.

Advantageously, the invention may provide with a beverage cycle containing temperature-slopes information to be used in the activation of at least one pipe heater in order to provide different temperatures to different sections of the beverage preparation cycle. Accordingly, slopes provide in the course of the execution of the beverage cycle for differing power information provided to the controller and therefrom to the pipe heater.

According to the embodiment of the invention, the method for preparing a beverage comprises the step of providing at least one ingredient inside a brewing chamber, the step of activating at least one pump to supply a diluent liquid from a diluent source to said brewing chamber, the step of supplying power to at least one pipe heater for heating the diluent liquid flowing therethrough by setting the temperature of the diluent exiting the pipe heater on at least two different values.

In a preferred version of this first embodiment, water at ambient temperature is fed to the brewing chamber by the pump as soon as the apparatus receives a request of dispensing a beverage; at the same time the pipe heater is switched on and it starts heating the water that is pumped through it, until it reaches the required temperature for the brewing step. In other words, the ingredient in the brewing chamber is initially extracted with the water coming from the tank, this water is at room temperature or at a temperature in such range of temperatures (e.g. 20 to 40° C.) and may be slightly heated by a residual heat in the pipe heater or by minimal power supply to the heater. Thus, a first part of the brewing step is carried out with a water at ambient temperature or at a temperature below the temperature required for the brewing, e.g. a temperature below 90° C.

Summarizing, the method provides for the starting the pump and switching on the pipe heater at the time when the apparatus receives the request for a beverage to be dispensed; the pipe heater is preferably switched off when not in use, or minimally turned on that is it can be kept at a low temperature, e.g. 30° C. e.g. by temporarily switching on the heater from time to time with a limited amount of energy.

The water flowing through the pipe heater is then quickly heated so that after the first reduced volume of water has exited the pipe heater, the water reaching the brewing chamber has the required extraction temperature, above 80° C., e.g. about 90° C. The remaining part of the extraction step is thus carried out at a higher temperature. Prior to this step, flow-rate of the diluent may be reduced, e.g. by slowing down or halting the pump, in order for the temperature change between the first dispensed temperature and the second is as fast as possible, or—conversely—the amount of water dispensed. This method is particularly suited for beverages requiring a volume of at least 30 ml, preferably at least 50 ml, e.g. larger coffees and cappuccinos, Americano coffees and similar. The method has at least three advantages: there is no, or very little, time spent in waiting for the apparatus to heat up from ambient temperature, the heater can thus be switched off when not in use (with great energy savings), and the initial extraction step at reduced temperature provides for an improved extraction of certain compounds, from the ground ingredient (e.g. coffee) in the brewing chamber, which can be better extracted at relatively lower diluent temperatures.

According to another embodiment of the invention the beverage preparation apparatus and the relative method allow to obtain drinks bearing differing preparation recipes by dispensing at least at one temperature at least two diluent liquids from two sources of diluent, to be mixed an reconstituted into a finished drink. As mentioned, one of the diluents may be in the form of vapor, namely steam. The invention may include a device to foam milk, e.g. a Venturi-effect based unit.

According to this embodiment, the beverage preparation apparatus comprises a brewing chamber for containing at least one ingredient for the beverage preparation, and two diluent sources, preferably provided with a dedicated pump, to supply the same diluents liquid, or two diluent liquids, and at least one pipe heater for heating a diluent liquid flowing therethrough from at least one of said diluent sources. The brewing chamber is arranged to receive at least one diluent liquid from at least one of said two diluent sources.

The method for preparing a beverage by this apparatus comprises the step of providing at least one ingredient inside a brewing chamber, the step of activating one diluent pump to supply a diluent liquid from a diluent source to said brewing chamber, and the further step of activating the second diluent pump to supply a diluent liquid from the second diluent source, further comprising the step of supplying power to a pipe heater for heating the diluent liquid supplied by at least one of said two diluent sources, or from both said diluent sources.

Advantageously the presence of two diluent liquid sources, for example in the form of two tanks or two supply lines, or either a single tank and two different piping ducts, allows to supply the same diluent liquid, or two different diluent liquids (for example water and milk) to form the desired final beverage. It has to be noted that at least one diluent liquid, or both diluent liquids, can be supplied inside a respective brewing chamber where at least one ingredient is housed. As an example, water can be fed to a first brewing chamber containing a coffee powder and water can be fed to a second brewing chamber (ideally a capsule) containing a soluble ingredient such as e.g. a ginseng coffee mix or a non-dairy "creamer" or "whitener" (e.g. to make milky coffees) or an aroma, in liquid or solid form, to provide additional range of options to the beverage menu (e.g. almond or cinnamon aroma).

Therefore, the apparatus and the method allows to obtain a wider range of different beverages.

According to one preferred version of this embodiment in which the diluents are said to be water and milk, if liquid milk is used, it can be seen as an ingredient forming the final beverage in view of the fact that it is not fed to a brewing chamber to extract or dissolve the ingredient(s) therein located. Milk can be fed to a heater according to the invention before being added to the part of beverage coming from the brewing chamber.

In an exemplary embodiment, milk is first foamed in a known foaming device (e.g. to provide the required amount of foam for a cappuccino) and secondly the foamed milk is passed through a pipe heater to stabilize and improve the foam previously obtained. It was found that a long-lasting milk foam can be reached very quickly and efficiently when the foamed milk is treated in a pipe heater, without the foam losing the plasticity required for flowing through the pipe into the final beverage.

The milk foam stabilizer including a pipe heater as herein defined may be used in any beverage preparing apparatus, including traditional apparatuses where the diluent, or water, heater is a traditional heater. Accordingly, the present invention also relates to a device for foaming milk, that comprises a device for foaming milk and a pipe heater. The invention relates also to a beverage preparing apparatus that comprises a brewing chamber, means to foam milk and means to feed the foamed milk to the beverage exiting said brewing chamber, characterised in that it further comprises a heater, and preferably a pipe heater, positioned downstream said device for foaming milk to heat said foamed milk before it is fed to said beverage. The invention also relates to process for preparing a foamed milk that comprises the step of heating the foamed milk in a pipe heater while flowing said milk through said pipe heater. The meaning of the above words is to be interpreted according to the description and the definitions of the present invention.

Cleaning and sanitizing steps of the pipe heater used for the milk treatment are carried out in a way known in the art for milk systems using traditional heating and foaming means.

Heating of non-foamed milk in a pipe heater is encompassed in the present invention.

The apparatus and the method according to the invention advantageously comprise some aspects which will be now discussed. Please note that these aspects can be provided in all the embodiments of the claimed apparatus and methods according to the invention.

According to an aspect of the invention, the at least one pipe heater can be operated, i.e. activated by the controller by supplying power to the pipe heater in order to set a constant value of the temperature or to set at least two different temperature values. In other words, the temperature of the diluent exiting the at least one pipe heaters can be controlled to be constant, or to be modified during the beverage preparation cycle.

It has to be noted that in the embodiment wherein the pipe heater comprises two or more heating sections, the controller is configured to independently control two or more pipe heaters and/or two or more heating sections of at least one pipe heater.

Advantageously, according to a further aspect of the invention, the constant temperature value of the diluent or one of said two or more different temperature values can be maintained for a predetermined amount of time and/or for a predetermined quantity of diluent liquid passing through said pipe heater. This advantageously allows to provide diluent at a predetermined temperature, for example to carry out an infusion of the ingredient at a desired temperature.

According to a further aspect of the invention, the difference between the at least two temperature values is of at least 30° C., preferably of at least 40° C. and more preferably of at least 50° C. These difference values between the temperature used for the diluent liquid are particularly advantageous to provide the extraction of different aroma from the ingredient to increase the quality and the organoleptic complexity of the final prepared beverage.

According to still another aspect of the invention, the temperature of the diluent exiting the at least one heater, and in particular exiting at least one pipe heater, during the beverage preparation cycle is increased, by providing a second temperature value higher than a first temperature value. In this transition phase the operation of the at least one pump may be interrupted, to provide discreet steps of temperature for the diluent entering the infusion chamber. The step of providing a second temperature for the diluent advantageously allows to provide a different brewing of the ingredient, and in particular it may be used to reduce the amount of froth from the brewed ingredient and thus in the prepared beverage.

According to still another aspect of the invention, one of the temperature values on which the heater, for example the at least one pipe heater can be set, or the constant value on which the pipe heater can be set corresponds substantially to the ambient temperature of the diluent liquid or a temperature chosen from a range around ambient temperature, e.g. from 20 to 40° C. This advantageously allows to provide an extraction of the ingredient at ambient temperature, i.e. by using what sometimes is referred to as "cold extraction".

According to still another aspect of the invention, the at least one diluent pump can be stopped, or slowed down, so that the supply of the diluent is stopped or its flow rate is reduced. The stop or the slow down operations of the at least one pump is carried out preferably during the temperature transition between said at least two different temperature values of the diluent liquid. This advantageously allows to provide a longer infusion step of the ingredient and improved control over the exact temperature at which the foodstuff used for the beverage preparation is effectively contacted by the diluent.

According to a possible embodiment, the at least one pump is stopped for an amount of time no longer than 3 seconds, preferably for an amount of time no longer than 1 second, more preferably for an amount of time no longer than 0.5 second.

According to a further aspect of the present invention, the beverage preparation apparatus comprises two heaters, wherein one of said heaters is a pipe heater for heating a diluent liquid flowing there through and the other heater is a traditional heater, or both said heaters are pipe heaters for heating a diluent liquid flowing there through. The two heaters can be advantageously controlled independently so as to set a constant temperature value of the diluent passing therethrough, or to deactivate the heater, or to set it on at least two different temperature values.

According to a possible embodiment, one heater is deactivated and the second heater is controlled to set the temperature on at least two different values.

The pipe heater can be deactivated one or more times during the beverage preparation cycle. The frequency of the activation/de-activation sequence will provide the desired organoleptic and visual results of the final beverage as well as the set temperature of the same.

According to another possible embodiment, the two heaters are controlled to set a constant temperature value. The constant temperature value for one heater can be different from the constant temperature value set for the second heater.

According to another embodiment, one heater is set to a constant temperature value and the second heater is set on at least two different temperature values during the beverage preparation cycle.

The independent control of the two heaters allows to increase the flexibility in beverage preparation and subsequently the final quality.

According to another aspect of the invention, if two heaters are provided, either a traditional heater and a pipe heater, or two pipe heaters, one of said heater is arranged to supply a diluent liquid downstream of the brewing chamber, without passing inside the brewing chamber. By doing so, it is—advantageously—possible to provide the diluent liquid at desired temperature, preferably directly into the container of the prepared beverage, without providing an extraction of the ingredient inside the brewing chamber.

The expression "directly into the container of the prepared beverage" here means without entering in contact with the ingredient (foodstuff) in the brewing chamber, or to contact it only downstream of the brewing chamber, e.g. in a mixing bowl or, in the dispensing means, or other similar device available downstream of the brewing chamber but upstream from the user's container, e.g coffee-mug or tea cup. In other words, the two liquids can be mixed prior to delivery in the user's receptacle (container), e.g. cup or glass.

According to another aspect of the present invention, two diluent liquid sources are provided. It has to be noted that the liquid sources can be a diluent tank or a diluent supply line.

Additionally, it has to be noted that the expression two diluent sources also encompasses the embodiment wherein two ducts are exiting a common diluent tank.

It has also to be noted that according to the invention, the same diluent liquid, or two different diluent liquids, can be supplied from the two diluent sources.

The brewing chamber may be fluidically arranged to receive at least one diluent liquid from at least one of said two diluent sources, or to receive said diluent liquids from both said two diluent sources. According to a preferred embodiment, when two diluent sources are provided, the brewing chamber receives diluent from only one source and the other source supplies liquid in the receiving container of the prepared beverage, for example a cup.

Also the at least one heater can be arranged to receive diluent from one diluent source or from both diluent sources. Preferably, if two heaters are provided and two diluent sources are provided, one heater is arranged to receive diluent from one source and the other heater is arranged to receive diluent liquid from the other source.

Additionally, as already mentioned above, according to a possible embodiment a single diluent tank can be provided and two diluent sources, i.e. two ducts exiting from the tank can be provided, preferably with a respective pump, to supply diluent independently one to another. Suitable pumps are e.g. rotary pumps, immersion pumps, vibration pumps, peristaltic pumps, air-pumps, jet pumps.

One heater, and in particular a pipe heater, can be provided for each duct exiting from the tank, or a single heater receives the diluent from said two ducts exiting from a common diluent tank.

According to still another aspect of the invention, at least a portion of the at least one heater, preferably a pipe heater, delimits a portion of the brewing chamber. More in detail, according to a possible embodiment, at least one heater delimits the upper portion, i.e. the inlet area of the brewing chamber.

At least one flange can be provided at one end of the pipe heater, or two flanges at each end of the pipe heaters, to delimit an heating chamber inside the pipe heater and one flange is arranged to solidly delimit also an upstream area of the brewing chamber. The at least one flange provided at one end of the pipe heater can be provided with at least one safety sensor and/or at least one temperature sensor, and/or with one or more by-pass or control valves.

According to still another aspect of the invention, means for closing the brewing chamber are provided, for example in the form of a valve able to prevent the outflow of the liquid from the brewing chamber.

The possibility of closing the brewing chamber, thus creating an hermetically sealed area (where foodstuff is contained preferably under pressure), advantageously allows to provide a pre-infusion step, under pressure or at reduced pressure, wherein the diluent liquid is supplied to the brewing chamber and blocked therein.

Additionally, the at least one pipe heater can be of the closed type, i.e. provided with connections at both ends, for example with ducts so that it can receive fluid under pressure. The at least one pipe heater can be also of the open type, i.e. provided with at least one end, arranged to work at atmospheric pressure, preferably this end is not connected to a duct and it is arranged into a diluent tank or to a liquid collecting container.

According to an advantageous aspect of the present invention, the at least one pipe heater of the beverage preparation apparatus can be switched off after a beverage preparation cycle, thus avoiding energy consumption in the standby mode of the apparatus. When a new beverage as to be prepared, the pipe heater is activated and the desired temperature can be quickly reached.

According to an aspect of the invention, the beverage preparation apparatus comprises at least two heating means including at least one pipe heater for heating a diluent liquid flowing therethrough, which can be independently controlled. The at least two heating means are fluidically connected in series or are connectable in series with suitable valve means when required to flow diluent from one heater to the other ones, downstream to the first heater; they can comprise two or more heating sections of a least one pipe heater (as for example discussed above), and/or two or more separate pipe heaters.

Heating sections of a pipe heater are electrically insulated from each other.

The two or more heating sections are independently controlled by at least one controller of the beverage preparation apparatus. The controller is configured to independently supply power to the two or more heating sections.

It has to be noted that the expression independently controlled is used to indicate that each heating section of the pipe heater can be controlled, i.e. activated, or maintained deactivated, independently from the remaining one or more other heating sections of the pipe heater. It has to be also noted that each section can be activated (preferably for a desired amount of time) and/or it can be deactivated (preferably for a desired amount of time), independently from one or more other heating sections of the pipe heater.

During the beverage preparation the at least one heating section can be deactivated at least one time.

According to an aspect, two or more heating sections of the at least one pipe heater are formed by two or more portions of heating film applied on the surface of the pipe heater. Each portion of heating film is electrically connected to at least one controller, or to a common controller, to be independently controlled by supplying power independently to each heating section of the pipe heater.

The independent control of two or more heating sections of the pipe heater advantageously allow to better control the beverage preparation process, in particular by allowing to heat the diluent liquid at a predetermined temperature quickly and with a low energy consumption. Moreover such arrangement allows to evaluate the best control slope to obtain the desired temperature in the final beverage depending on variables of the diluent such as flow-rate, viscosity, boiling point, incoming temperature of the diluent, etc. Also in the case the heating means comprises two or more separate pipe heaters, they can be controlled independently as discussed above in connection to the heating sections of the pipe heater. The independent control of two or more pipe heater advantageously allow to better control the beverage preparation process, in particular by allowing to heat the diluent liquid at a predetermined temperature quickly and with a low energy consumption, as well as adapt the temperature control to the different specifics of the diluent utilised for the beverage preparation, as previously indicated.

According to a possible embodiment, the two or more separate pipe heaters are arranged in series along the line through which the diluent liquid passes.

BRIEF DESCRIPTION OF THE DRAWINGS

Further advantages and features of the present invention will be more apparent from the description below, provided with reference to the accompanying drawings, purely by way of a non-limiting example, wherein.

DETAILED DESCRIPTION OF THE INVENTION

Figure 1:
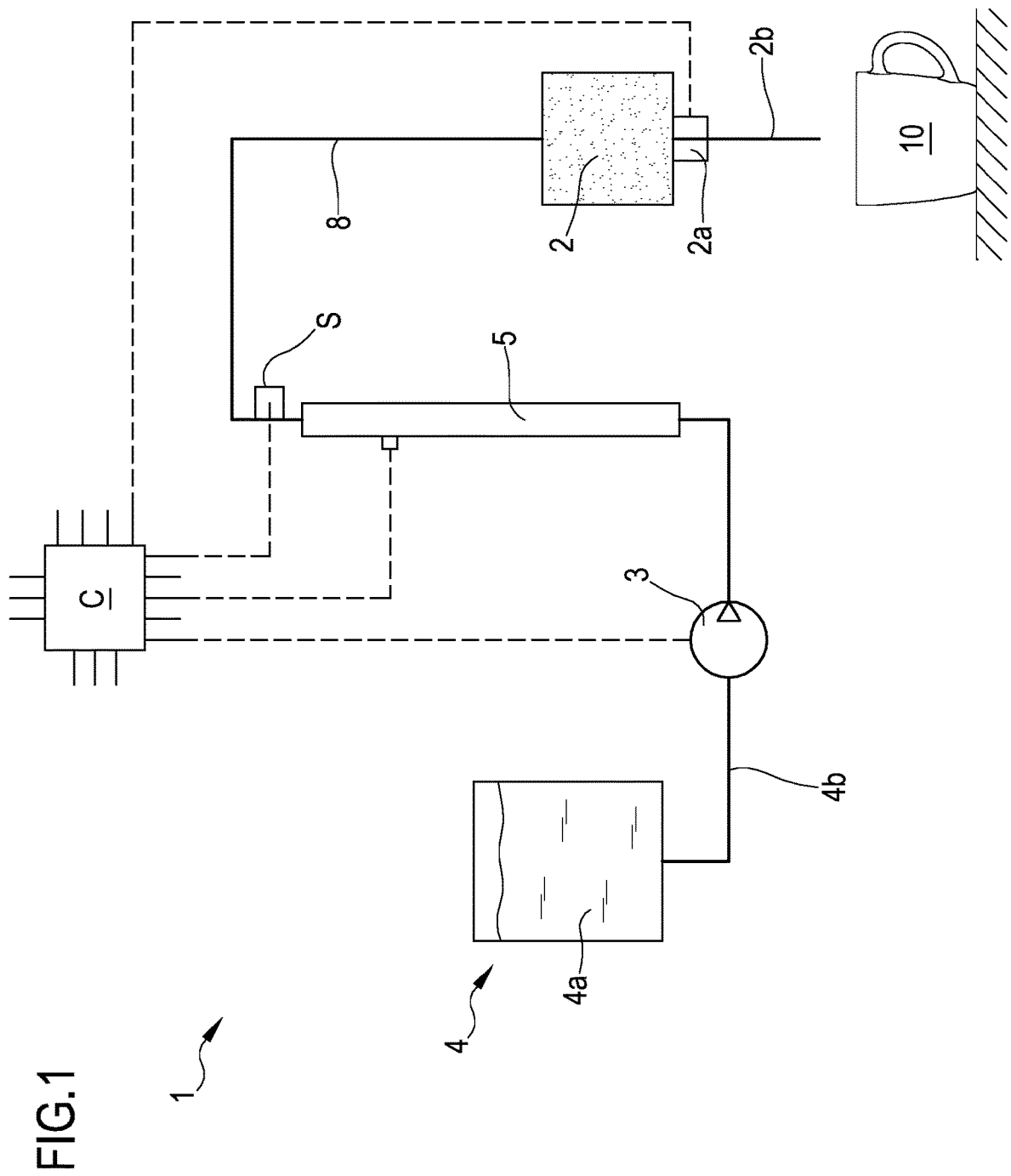
FIG. 1 is a schematic view of a first possible embodiment of the beverage preparation apparatus according to the present invention, wherein one pipe heater is provided and the temperature of the diluent liquid can be set on at least two different values during the beverage preparation.

In the beverage preparation apparatus according to the invention, for example schematically shown in FIGS. 1-3, 4 and 4a, the preparation of a beverage, such as coffee, tea, hot and cold drinks, or any other liquid foodstuff, is obtained from a pre-determined amount of a brewing ingredient, for example an extractable, or soluble, or dilutable product, either liquid or solid. Preferably, the dose of brewing ingredient comprises a powder product, such as coffee powder, which is brewed by means of diluent liquid (brewing liquid) and/or a gaseous diluent such as vapor, e.g. steam.

The apparatus 1 is provided with a brewing chamber 2, inside which one or more ingredients are temporarily housed during the beverage preparation cycle, and in particular when the diluent liquid passing inside the brewing chamber 2 extracts the ingredient.

The brewing chamber 2 can be shaped in a known manner, and it can be opened and, preferably hermetically, closed so as to allow a dose of one or more ingredients to be housed therein, and extracted therefrom, at the end of the beverage preparation cycle.

Additionally, the brewing chamber 2 can be provided with a diluent inlet, from which the diluent liquid is injected therein, and a diluent outlet from which the prepared beverage can exit the brewing chamber to reach for example a beverage container 10.

Suitable dispensing means, comprising for example a dispensing duct 2b, are provided to dispense the beverage from the brewing chamber 2 into a beverage container 10.

According to an aspect of the invention, means 2a for closing the brewing chamber is provided, for example said means 2a comprises a valve able to prevent the outflow of the liquid from the brewing chamber until a programmable pressure is achieved or a set time has elapsed. Such pressure is preferably equivalent to a fraction of the pressure used during the beverage preparation.

The ingredient can be supplied to the beverage preparation apparatus 1, and in particular to the brewing chamber, either in a loose form, for example as dehydrated powder or ground and roasted powder loosely conveyed into the chamber by appropriate conveying means (not shown in the drawings), preferably appropriately dosed by means of a metering device. Alternatively the ingredient can be used in pre-packaged from, e.g. contained in a primary packaging such as a so-called "capsule", or—similarly—in a filter pod or other single-serve container. Also in this case the pre-packaged ingredient will be inserted in the brewing chamber 2 by appropriate conveying means (not shown in the drawings) which may include—as for the ingredient in loose form—also manual loading by the end user.

When the ingredient is supplied to the brewing chamber in a pre-packaged form, suitable piercing means of the capsule can be provided inside the brewing chamber, or within the pre-packaged ingredient e.g. the capsule, or belonging to the capsule, to allow the passage of the diluent liquid through the capsule to brew and extract the ingredient contained therein and let the beverage flow out from the chamber.

As mentioned above, at least one diluent liquid, such as water, is used in the apparatus 1 for the beverage preparation according to the invention.

The diluent liquid, for example water, is usually stored within the apparatus 1, in a water reservoir, or tank; alternatively it can be drawn from mains water, through an appropriate feeding system and valve, available to the skilled in the art.

The apparatus 1 is provided with at least one diluent source 4, 4' from which the diluent can be provided.

It has to be noted that the term "diluent source" is used herein to indicate not only a diluent tank 4a, 4a' (reservoir) or a supply line (mains line), but also the ducts 4b, 4b' allowing to distribute the diluent therefrom. In the following description the word tank is used to refer to both a reservoir (or independent tank), a header tank receiving water from a mains water line and a mains water line.

In other words, if two diluent sources 4, 4' are provided they can comprise two diluent tanks 4a, 4a' and respective ducts 4b, 4b'. According to a possible embodiment, a single tank 4a having two ducts 4b, 4b' exiting therefrom can be provided.

Figure 4:
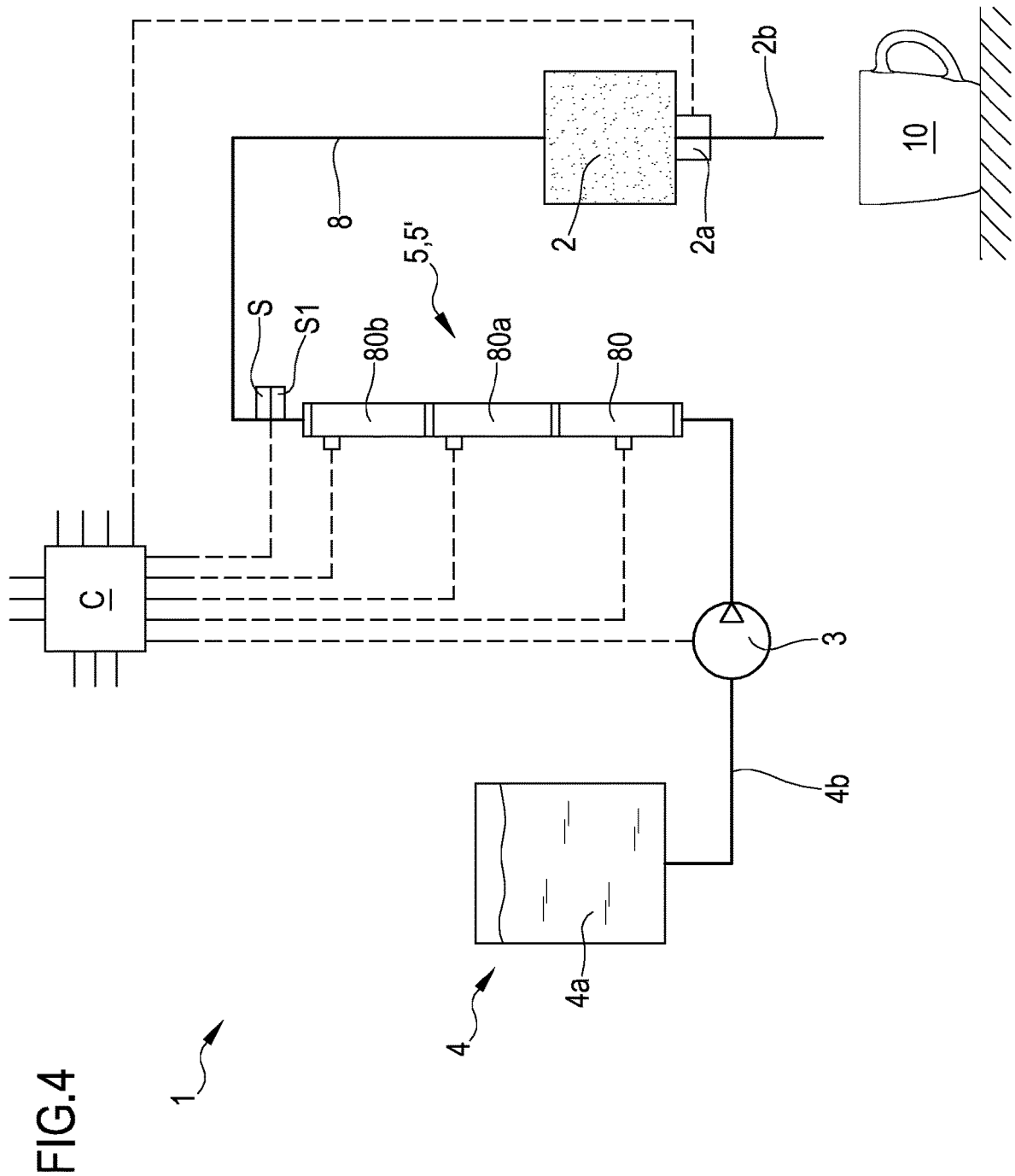
FIGS. 4 and 4a are two schematic views of further possible embodiments of the beverage preparation apparatus according to the present invention, wherein at least two heating means are provided and wherein the at least two heating means are independently controlled by the controller. In the embodiment of FIG. 4 the two heating means comprises at least two heating sections of a pipe heater, and in the embodiment of FIG. 4a, the two heating means comprises two separate pipe heaters.
Figure 4A:
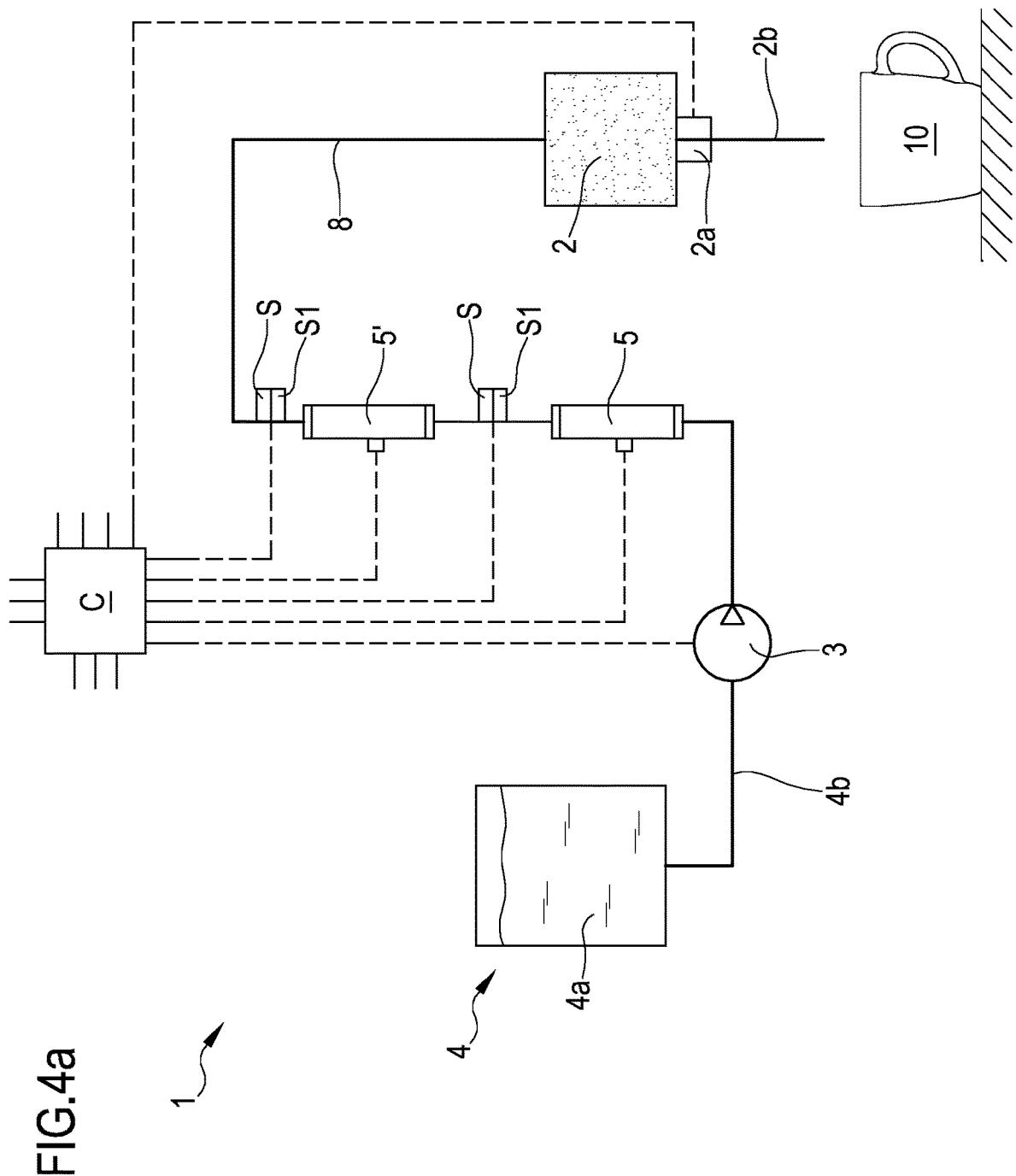

In the embodiment shown in FIG. 1 and in FIGS. 4 and 4a, the apparatus 1 is provided with a diluent source 4 comprising a tank 4a and a duct 4b exiting therefrom.

Figure 2:
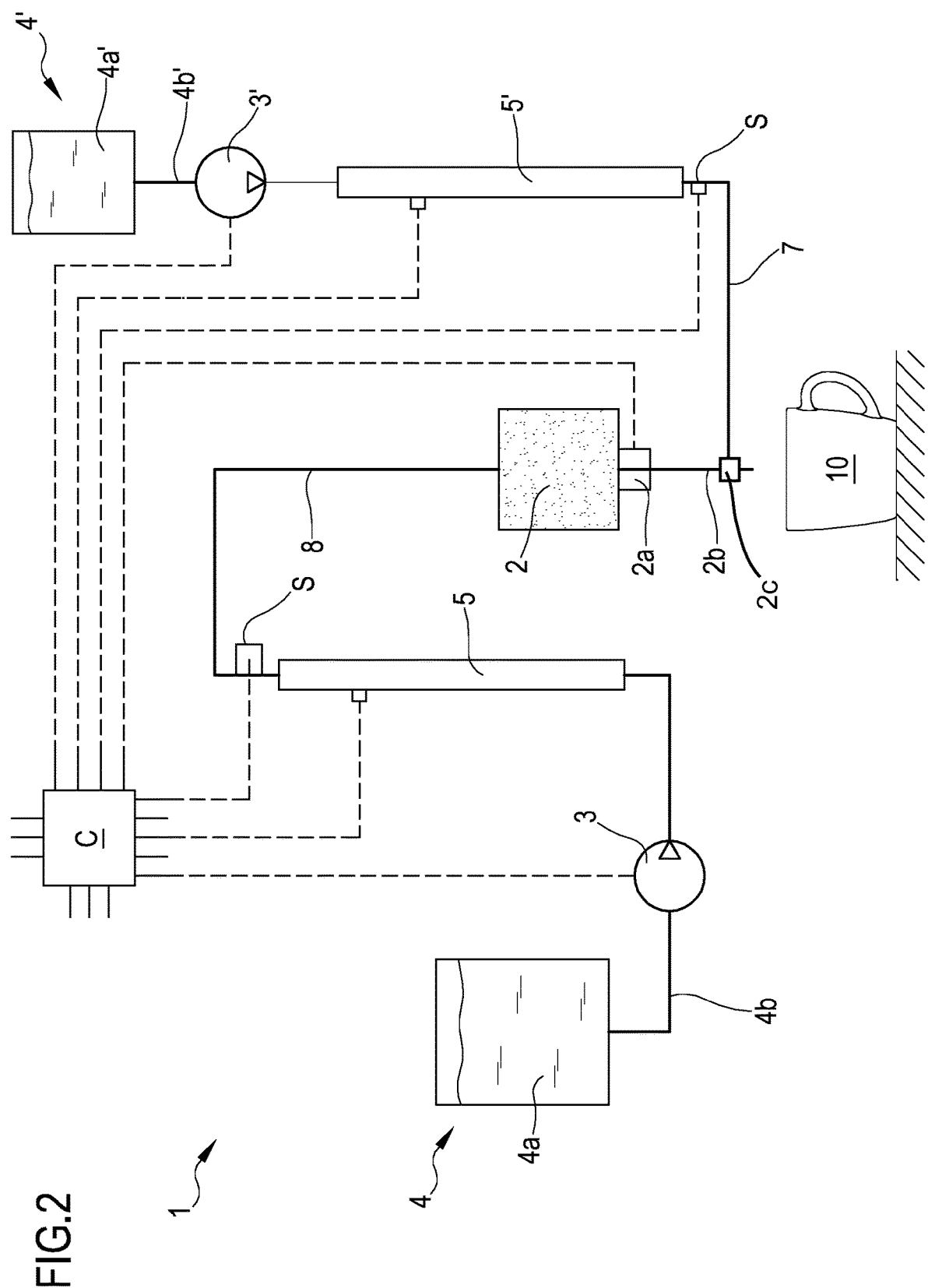
FIG. 2 is a schematic view of a second possible embodiment of the beverage preparation apparatus according to the present invention, wherein two diluent sources are provided to supply the same diluent, or two different diluents.

In the embodiment shown in FIG. 2 two diluent sources 4, 4' are provided with separate tanks 4a, 4a' and different ducts 4b, 4b'.

Figure 3:
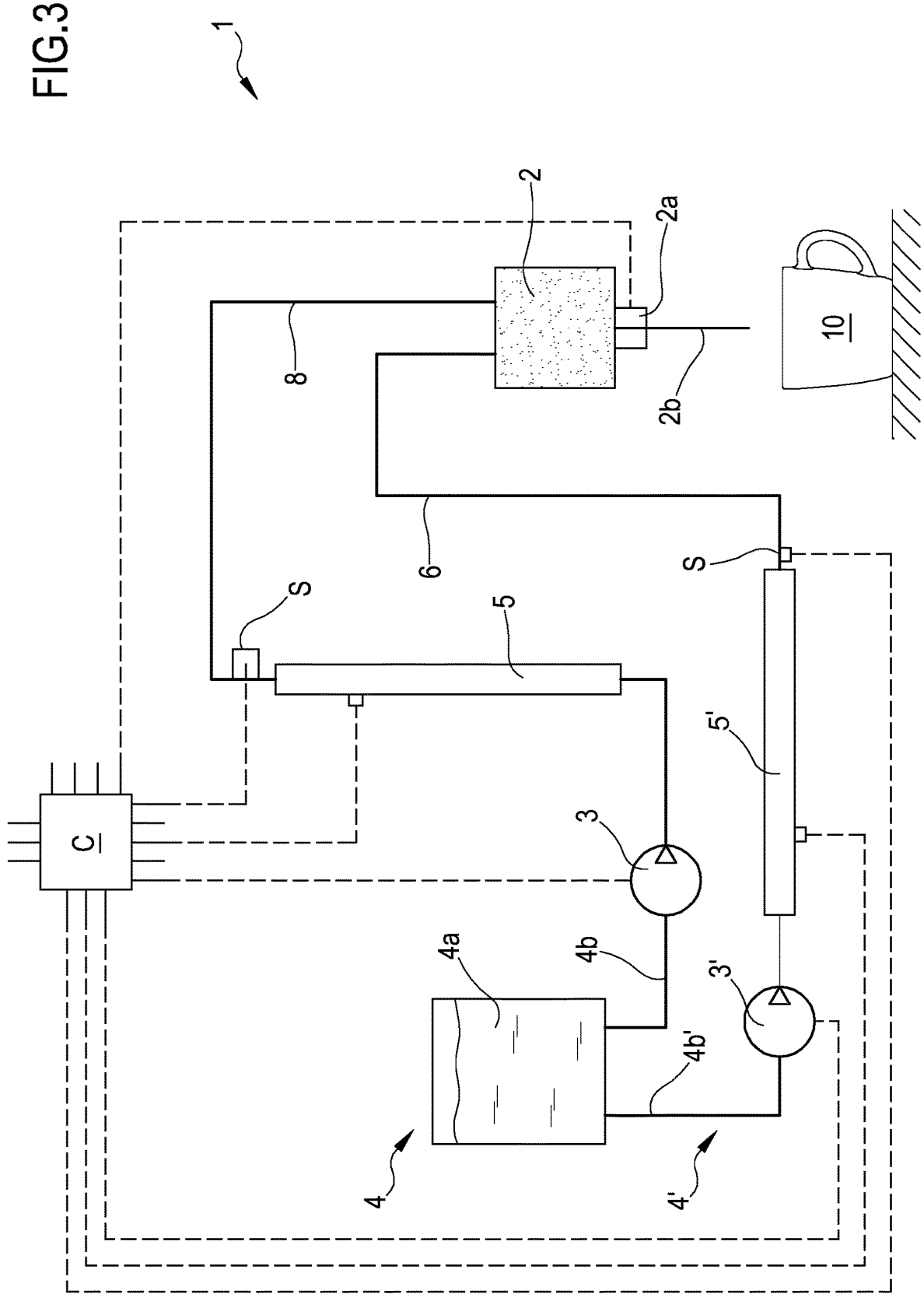
FIG. 3 is a schematic view of a third possible embodiment of the beverage preparation apparatus according to the present invention, wherein two pipe heaters are provided, the diluent exiting one pipe heater can be supplied downstream of the brewing chamber, or both the liquid exiting the two pipe heaters can be supplied inside the brewing chamber.

In the embodiment shown in FIG. 3, a single diluent tank 4a is provided with two ducts 4b, 4b' exiting therefrom to supply the diluent liquid to two pipe heaters 5, 5'. It has to be understood that the diluent source 4, 4' of the apparatus 1 can supply the same diluent liquid, or two different diluent liquids for example water and milk (milk may also be an ingredient) to prepare the desired final beverage. Two diluent sources are present if two different diluent liquids are to be used.

Additionally, as for example shown in the embodiment of FIG. 2, a part of the diluent liquid can pass inside the brewing chamber 2 or outside it, to directly provide the diluent liquid, downstream of the brewing chamber, for example in the dispensing means 2b, or directly in the container 10 for the prepared beverage, or in a mixing area where the two diluents may be mixed.

According to a possible embodiment, when two diluent sources 4, 4' are provided (see for example FIG. 2), the brewing chamber 2 receives diluent from only one source and the other source supplies liquid downstream of the brewing chamber.

In the embodiment shown in FIG. 3, wherein the diluent exiting the tank 4a is supplied by two ducts 4b, 4b' in two pipe heaters 5, 5', both diluents can be fluidically connected to pass inside the brewing chamber 2 as shown by line 6 exiting the second pipe heater 5' in FIG. 3. According to a preferred embodiment, the brewing chamber 2 receives diluent from only one duct 4b connected to a first pipe heater 5, while the second duct 4b', connected to the second pipe heater 5', supplies liquid downstream of the brewing chamber, see continuous line 7 exiting pipe heater 5' in FIG. 2, in a mixing device (e.g. a mixer) 2c.

The apparatus 1 is further provided with at least one pump 3, 3' to supply, preferably under pressure, the diluent liquid from one or more diluent source 4, 4'. The pump 3, 3' is preferably electrically operated, and different known types of pump can be used in the apparatus 1 according to the invention, e.g. selected from any of vibration pumps, peristaltic pumps, centrifugal pumps, jet pumps, immersion pumps or rotational pumps. Preferably the at least one pump is able to provide pressures up to 20 bars.

The pump 3, 3' can be operated also to modify the flow rate of the diluent liquid.

The apparatus 1 further comprises at least one heater 5, 5' to transfer heat to the diluent liquid passing therethrough. Preferably, the at least one heater is a pipe heater. If the apparatus 1 is provided with two heaters 5, 5' (two heating means), or more than two heaters, at least one of the heaters is a pipe heater.

More in detail, if two heaters 5, 5' are provided one of them is a pipe heater for heating a diluent liquid flowing there through and the other heater is a traditional heater, or both the heaters 5, 5' are pipe heaters for heating a diluent liquid flowing there through, as for example shown in the embodiments of FIGS. 2 and 3.

A traditional heater is not shown in the figure but according to the invention it can be provided and as such provide certain advantages, such as providing a bulk quantity of pre-heated diluent, which can be used to cover intense usage or so called "peak-use" of the apparatus by its users.

In more detail, the apparatus 1 comprises at least one heater of the said "pipe" type, that is a hollow pipe. The pipe heaters can be preferably provided with a linear shape (straight pipe heater), although it may utilized in other shapes, for example U-shaped, coil-shaped, serpentine-shaped etc. as previously discussed with reference to thin and thick film heaters.

The pipe heater 5, 5' may have a length between 5 and 25 cm, with an outer diameter comprised between 6 mm and 25 mm and a thickness which may vary from 0.4 to several mm, depending on the material used. One preferred material is a quartz compound, known in the art for this use.

The pipe heaters are able to withstand at least a test pressure of over 40 bars, so that it is suitable for use with electrical pumps able to reach a maximum pressure of 20 bars during the normal dispensing cycle.

Although thickness may vary depending on the type of material used, it is a preferred feature to use a pipe heater having a thickness lower than 2.5 mm, in order to maintain a low heat inertia, thus a high speed in the heat transmission rate.

For electrical connection of the pipe heater, typically this heater may present an electrode strip solidly tightened or bonded onto the outer surface of the heater for electrical connection at 110, 120, 230 V. etc. It may also present an insulated zone. For instance, a couple of electrodes and insulated parts could be located at each tip of the pipe, although other configurations are possible.

The pipe heater 5, 5' may have an insert, hollow or full made of plastic suitable for foodstuffs and for use with temperatures ranging between 50 and 100° C., and up to 200° C. Alternatively the pipe heater may contain a mesh or similar device inserted in the pipe itself, in order to maximize the thermal exchange between the surface of the pipe heater and the liquid passing therethrough. Optionally, such inserts may be devised to increase turbulence of the liquid flow, thus increasing thermal transfer, and reduce surface tension of the liquid to be heated in relation to the internal surface of the pipe. Such devices are commonly available. One such core is disclosed by Johnson et al. in US20100046934.

As mentioned above, the pipe heaters will be provided with a heating film or, preferably, a coating containing suitable metal oxides and/or carbon nanotubes (CNT), so that immediate heat generation can be achieved, as soon as power is provided to the connecting leads. The power of the pipe heater will be ranging depending on the desired specific application, such as double heaters for long drinks quick delivery, or single-pipe for small espresso-only beverages. Suitable power of the pipe heaters can be selected from a wide range of ratings, preferably between 500 W and 3500 W, or 500 W to 2500 W.

According to a possible embodiment, the apparatus can be provided with at least two heating means 5, 5', including at least one pipe heater for heating a diluent liquid flowing therethrough, The heating means 5, 5' may comprise two or more heating sections 80, 80a, 80b of a pipe heater 5, as for example shown in the embodiment of FIG. 4. In particular, in the embodiment shown in FIG. 4, the pipe heater 5 is provided with three heating sections 80, 80a, 80b.

The two or more heating sections of the pipe heater 5 are formed by two or more portions of heating film applied on the surface of the pipe heater; the embodiment shown in FIG. 4 has three portions of heating film 80, 80a, 80b.

As mentioned, the portions of heating film on the pipe's surface are electrically insulated from each other, i.e. they can be activated independently one from the others (or all together) so that the water or fluid passing through the pipe is heated to a higher or lesser temperature according to how many portions are activated by the controller C.

Preferably, the heating sections are independently controlled by a controller C.

According to another exemplary embodiment, as for example shown in FIG. 4a, the two or more heating means 5, 5' of the apparatus can be formed by two or more separate pipe heaters 5, 5' which are independently controlled by a controller C. The two or more separate pipe heaters 5, 5' are preferably arranged in series, so that the diluent liquid exiting one pipe heater 5 is directed to the inlet of a second pipe heater 5'.

In both cases, using multiple heating means or heating sections of the same heating means allows for more accurate calibration of the power to be used in order to heat a specific amount of diluent in a determined amount of time.

In other words, the flow-rate of the diluent may be varying upon differing conditions during the beverage preparation process (e.g. a more compact ingredient bed increasing the pressure required to pass through i.e. permeate through, the ingredient) or different depending on the type of beverage preparation (e.g. by utilizing within the volume of the brewing chamber different amounts of coffee powder, or freshly minced teas. In both cases an arrangement utilizing multiple heating means, or multiple sections of the same heating means, allows given the same amount of time to reduce, or increase the power transferred by the heating means to the diluent via the pipe. In such case at increasing or decreasing rates of flow-rate the power needed per each time-unit will be increased or decreased to provide the required temperature for the diluent that is fed to the brewing chamber.

Alternatively, the same amount of power required to heat the same amount of diluent to the desired temperature may be utilized during a longer period of time.

In order to adapt to a wider range of changes in the flow-rate, i.e. to adapt the total time required to heat the same amount of diluent to the desired temperature, the controller may also include means to control the at least one pump of the apparatus, thus increasing or reducing the flow-rate via such external means. E.g., in case the temperature of the diluent exiting the heating means is below the required value, the flow rate of the diluent is decreased by acting on the pump(s); the control can be made in real-time, during the beverage preparation.

In order to provide an apparatus suitable to be used in at-home situations, it is a preferred feature to maintain the total rated absorption of the apparatus below the rated load of a domestic socket and preferably to maintain the total rated absorption below 12 Amps.

According to an aspect of the invention, the apparatus 1 comprises at least one temperature sensor S to measure the temperature of the diluent liquid exiting the heater 5, 5'.

Temperature sensors S can be arranged directly on the heater or in the close proximity of the heater to detect its temperature and they are used for its regulation. Alternatively the at least one sensor S can be positioned in the hydraulic circuit downstream of the heater, e.g. a pipe heater.

Suitable temperature sensors S are for example one or more thermistor, either of the NTC (negative temperature coefficient) type or of the PTC (positive temperature coefficient) type. Other types are available to the skilled in the art: for instance the at least one sensor S can also comprise bi-metallic sensors positioned at a distance from the pipe heater itself.

In any case, the sensor S is arranged to directly measure, or to evaluate, and more generically, accurately control, the temperature of the diluent as heated by the heater, and optionally to control the surface temperature of the pipe heater itself if the heater is a pipe heater.

One or more sensors S, and in general the temperature monitoring system, is connected to a controller C, as later described. The temperature monitoring software in the controller may include feedback loops for improved control and accuracy, preferably in a real-time condition, so as to be able to control the temperature within the brewing step and to act on the heating of the pipes or pipe's portions according to the detected temperature values, during a step of beverage preparation. Moreover, algorithms available to the skilled in the art may be included in the controller's software to provide improved accuracy over the maximum range of temperature effectively achieved, with respect to temperatures readings above and below the pre-set value.

The apparatus 1 can be also provided with at least one sensor S1, see for example FIGS. 4 and 4a, for measuring the diluent liquid flow rate. The sensor may be arranged downstream of a heater 5 or preferably upstream the heater (with respect to the diluent direction of flow (from pump to brewing chamber) or upstream of the heater and the pump.

It has to be noted that the current flow rate value of the diluent liquid, for example passing through said at least one pipe heater 5, can be evaluated by means of the operating point of the at least one pump 3 intended to supply a diluent liquid from at least one diluent source 4, and/or by means of at least one flow sensor S1 or of a pressure sensor.

According to a possible embodiment, the at least one pipe heater can be of the so-called self-regulating types, i.e. without any control to allow for accurate and on-line monitoring of the temperature of the diluent liquid used for the drinks preparation. In such case a steady flow and appropriate rating of the heating means will provide consistently the diluent to be heated at the required temperature. Self-regulating films may be used in a range of temperatures between 80° and 130° C., preferably between 85° C. and 99° C.

For safety reasons the pipe heaters can be provided also with at least one safety cut-off switch that allows for immediate breaking of the power supply to the pipe heater in case the sensor detects a temperature exceeding a threshold value, which may be chosen in a range of temperatures between 90° C. and 180° C., preferably the temperature threshold value is chosen above 100° C.

Additional sensors (not shown), all of which are available to the skilled in the art, may be used for detecting lack of diluent e.g. if diluent is detected in less than 50% of the pipe. Therefore, it is possible to prevent the use of the pipe heater in case there is a considerable lack of diluent inside the pipe. In fact, in this case, the pipe heater is unable to sufficiently dissipate the heat and there is a high possibility to irremediably damage it, be it thin film or coating, etc. In case the sensor intended to detect the lack of diluent is activated, the power supply to the pipe heater has to be immediately cut off, for which it needs providing adequate software instructions in the controller C.

The pipe heater may be assembled using tie-beams, or click-on design made in high modulus thermo-injected plastics or otherwise apt fixations for two flanges, in detail one inlet flange and an outlet flange. Thus, the pipe heater becomes solidly attached to the flanges, and being provided with appropriate sealing means, the pipe heater can ensure perfect hydraulic sealing under working (and test) pressures. Fittings for connecting upward and, optionally, downward sections of the hydraulic system to the pipe heater are also provided. In an alternative embodiment, the downstream flange, on the outer flow path of the drink-preparation system is also—on the opposite side of the same piece—part of the brewing chamber, to provide directly the water or other diluent into the brewing chamber. In such arrangement, the heat-loss of the diluent is minimal since the distance between the heating area and the brewing or drink preparation area is minimised.

The inlet and/or outlet liquid ducts to/from the heater (either pipe heater or traditional heater, may be equipped with one-way valves (check-valve), even in the simplest form of a spring-activated one, to prevent backflow of the liquid from the heater (and in particular from the pipe heater), in other words to prevent emptying the heater (and in particular the pipe heater) from the incoming and outgoing liquid paths.

Other types of valves, such as 2-way and 3-way valves, may be devised to control the flow and thus directing the incoming diluent through one or more pipe heaters, to increase temperature and/or flow-rate.

According to possible embodiments, the outlet flowpaths ducts, from the pipe heater(s) may be designed to allow for discharging a programmable part of the diluent after heating, via at least one valve, to prevent contact of the same with the ingredient at sub-optimal temperature.

Similarly, parallel hydraulic circuits may be added to provide cleaning cycle to wash the internal part of the pipe heater.

Optionally, the pipe heater may be provided with recirculating means available to the skilled in the art, such as in CN202973847, for increased efficiency obtained by using the heat dissipated within the pipe assembly to pre-heat the incoming flow of diluent, e.g. water, milk.

Alternatively, or additionally, to the pipe heater described, the pipe heater(s) can also be of a simpler, not-pressurised "open pipe" type.

If the pipe heater is of the "open" type, it is preferably arranged to be vertical, when the beverage preparation apparatus is arranged in the operative position on a plane. In other words, the axis of a straight open type pipe heater is preferably perpendicular to the plane on which the apparatus 1 is arranged (i.e. parallel to the gravity force).

It has to be noted that, if two or more pipe heaters are provided, they can be connected in parallel, such as in CN102692079A. Alternatively or additionally, the apparatus can comprise multiple pipe heaters arranged in series, such as in CN201488232U, either working under pressure or in atmospheric condition.

Alternatively, the pipe heater can be of the "open" type, suitable to work under minimal pressure and anyway below 3 bar, preferably below 2 bars, and most preferably working below 1 bar pressure. In this case, there may be a collector of the outcoming hot diluent or liquid from the pipe heater, aimed at improving the mixing of the diluent's particles and related heat distribution. The hot liquid collector may be sealed or open.

A suitable pump for such lower pressure range is also available to the skilled in the art, e.g. a suction pump, or a jet pump, or an immersion pump to be used in such an arrangement. As stated the pressure is preferably minimal, below 1 bar, and as low as 0.50 meter i.e. about 0.05 bar. Flowrate may be adjusted to the required outlet-temperature for the diluent; an exemplary, not limiting flow rate will typically be between 1 and 10 ml/sec but it will change according to the requirements of beverage preparation.

The components of the apparatus 1 and of the heater 5, 5', such as the heat-conductive film of the pipe heater, the related temperature and diluent sensors S, are electrically connected to a controller C, i.e. a control unit preferably comprising a micro-processor-equipped CPU-board, or "electronic controller". The controller C optionally comprises a digital memory storage having a read-only and/or read & write areas, and appropriate software and hardware as available to a skilled person in the art, to manage the pipe heaters power supply. Also the at least one pump 3, 3' needed for the beverage preparation are operated by the controller C.

Preferably the controller C is also able to operate the brewing chamber control means 2a, e.g. an outflow valve 2a of the brewing chamber; the valve may be operated by the beverage pressure.

It also controls the diagnostics provided by each relevant component, and most relevantly by the sensors available in the apparatus, distinctively for temperature and over-temperature control, water presence control and, optionally, water-metering unit to detect the flow rate of the dispensed beverage(s).

The apparatus 1 can also comprise graphic user interface (GUI), to collect inputs from the user and to deliver information to the same. For instance, a suitable graphic interface is disclosed in WO2009016490 by the Applicant.

According to an aspect of the invention, the apparatus 1 is used to prepare a beverage by heating a diluent liquid at two different temperature values.

To this regard, the controller C supplies power to the heater 5, preferably a pipe heater, to set the temperature of the diluent exiting the heater on at least two different values T1, T2 during the beverage preparation cycle. At least one of said temperature value is maintained for a predetermined amount of time and/or for a predetermined quantity of diluent liquid passing through the pipe heater.

For example, according to a possible embodiment at least 5 to 100 cc are dispensed with diluent at a first temperature value T1 and then the heater is powered to increase the temperature on a second value T2, and maintained to this value for a predetermined amount of time and/or for a predetermined amount of diluent so as to reach the final volume of the prepared beverage.

The difference between the at least two temperature values T1, T2 is of at least 30° C., preferably of at least 40° C., and more preferably of at least 50° C.

It has to be noted that one of the temperature value can be substantially equal to the ambient temperature of the diluent liquid, i.e. substantially 25° C. In this case, if the diluent liquid is at the ambient temperature, the heater can be maintained deactivated without supplying power to it.

EXAMPLE 1

The first temperature value of the diluent liquid is set on 25° C. After a predetermined amount of supplied diluent liquid, preferably between 5 to 100 cc, the pipe heater is set to a temperature value of 90° C. If the apparatus is provided with a second pipe heater 5', as for example shown in FIGS. 2 and 3, it can be maintained deactivated according to a first mode of operation.

According to a possible embodiment, an additional quantity of diluent is supplied at a further temperature value, for example 95° C.

In this case the second pipe heater 5' can be powered to set the temperature of the diluent passing therethrough at 95° C.

It has to be noted that the diluent at a temperature of 95° C. can be also provided by powering the first pipe heater 5 to set the temperature on a further temperature value, for example of 95° C.

It has to be noted that additional liquid exiting the second pipe heater, for example at 95° C., can be provided in the brewing chamber, as for example in the embodiment of FIG. 3 (line exiting pipe heater 5'), or provided downstream of the brewing chamber 2, without passing therein, as in the embodiment of FIG. 2 and in the further embodiment of FIG. 3 (see continuous line exiting from pipe heater 5').

According to an aspect of the invention, the at least one diluent pump 3 is operated to stop, or to slow down, the flow rate of the diluent supplied by the pump 3. Preferably, pump stop, or the reduction of the diluent flow rate, is carried out preferably during the temperature transition between at least two different temperature values (T1, T2) of the diluent liquid. In general, a pump stop can be carried out when the brewing apparatus is operated to dispense a beverage, should the diluent temperature be too low, to avoid obtaining a final beverage having a too low temperature.

It has to be noted that even if in the example an explicit reference has been made to two pipe heaters 5, 5', it can be also applied to an apparatus 1 wherein one heater is a pipe heater and the other heater is a traditional heater.

EXAMPLE 2

According to a possible embodiment 20 cc of a first diluent may be injected from pipe 5 at a temperature of 30° C. through the brewing chamber at a pressure of 15 bars for 10 seconds.

Then, pipe heater 5 is operated to set the diluent's temperature at 90° C.

During such transition at least one time the electrical pump 3 may be disconnected for no longer than 3 seconds, preferably not longer than 1 second, and most preferably not longer than 0.5 second. Thus the diluent motion inside the pipe is slowed down or halted.

As already mentioned above, according to an aspect of the invention, two or more pipe heaters 5, 5' can be used to increase the flexibility of beverage preparation and also to provide a beverage preparation apparatus apt at drastically reducing the power consumption via use of at least two pipe heaters, so that the improved flexibility derived from the use of two heat sources is available even in case of limitations in the power supply, such as limited rating in a traditional socket used by home-appliances.

The two pipe heaters 5, 5' may be controlled in different ways according to different beverage preparation cycles.

For example, one of said pipe heaters, or both said two pipe heaters 5, 5', can be powered to set the temperature of the diluent exiting one of said pipe heaters, or exiting both said pipe heaters, on a constant value, and/or on at least two different values (T1, T2) during the beverage preparation cycle.

A combination of a constant value, or two or more different values, during the same beverage preparation cycle, for one or both the pipe heaters 5, 5' can be also provided.

It has to be noted that even if in the example an explicit reference has been made to two pipe heaters 5, 5', it can be also applied to an apparatus 1 wherein one heater is a pipe heater and the other heater is a traditional heater.

According to a possible embodiment, when two heaters 5, 5' are provided (and preferably in the case two pipe heaters are provided), as for example shown in the embodiments of FIGS. 2 and 3, one pipe heater is powered to set the temperature of the diluent passing therethrough on a constant temperature value, while the other pipe heater is powered to set the temperature of the diluent passing therethrough on at least two temperature values.

It has to be noted that according to an aspect of the invention, beverage preparation is achieved via dispensing at least at one temperature at least two diluent liquids, preferably diluent of different type, to be mixed and reconstituted into a finished drink. Therefore, according to a possible embodiment, as for example shown in FIG. 2, the apparatus 1 comprises two diluent sources 4, 4' provided with a dedicated pump 3, 3' to supply the same diluents liquid, or two diluent liquids, and at least one heater 5 for heating a diluent liquid flowing therethrough from at least one of the diluent sources 4, 4'.

The brewing chamber 2 is fluidically arranged to receive at least one diluent liquid from at least one of said two diluent sources 4, 4'.

In the embodiment of FIG. 3, the diluent from a single tank 4a is supplied into two ducts 4b, 4b', forming two sources of diluents to be supplied preferably to two pipe heaters 5, 5'.

According to a possible embodiment, the temperature of the two heaters 5, 5' is set to a constant value. In general, it has to be understood that the constant value set for a heater can be different to the constant value set for the other heater.

In other words, and with the purpose of resuming, this second exemplary embodiment provides for at least two diluent sources determining two separate diluent flow paths, one of which is to be used in conjunction with foodstuffs contained in the brewing or preparation chamber, and the other which is to be mixed with the former in order to obtain the final beverage.

Either diluent (or both) can be heated by at least one pipe heater and temperature control may be set to achieve at least one constant outlet temperature value. In an exemplary embodiment, a cold coffee can be prepared and added with hot water or another hot ingredient (e.g. milk), or viceversa.

EXAMPLE 3

According to Example 3, the first pipe heater is set on 92° C., while the second pipe heater is set on 97° C.

More in detail, the sequence is as follows: a consumer input commands to the controller, via a GUI, a new drink.

The first diluent pump 3 starts injecting the diluent liquid into pipe heater 5, for example at a flow rate of 2 ml/s.

Controller C turns heating of pipe heater 5 on, which is set to maintain 92° C., preferably with a tolerance of maximum plus minus one degree.

After a pre-determined, programmable amount of time, the second pump 3' is turned on by the controller C, for example at a flow rate of 6 ml/s. Then, the second pipe heater 5' heating is turned on by the controller C. There may be no changes in the temperature settings during the cycle of preparation.

The first pipe heater 5 is connected to the brewing chamber 2 filled for example with roast and ground coffee, weighing preferably 8 grams, median average grind (50% of distribution) 350 μM and brewed preferably at an average pressure of 16 bars. Suitable size dimensions are disclosed e.g. in EP1882432.

The second pipe heaters 5' may be an "open pipe" type of pipe heating assembly, optionally with a self-regulating heating film set to maintain 97° C., continuously, preferably at a fixed rate of 6 ml/s.

It has to be noted that one pipe heater 5, 5', of said two pipe heaters can be arranged to supply liquid exiting therefrom downstream of the brewing chamber 2, as for example shown in the embodiment of FIG. 2 with line 7.

However, both pipe heaters 5, 5' can be arranged to supply diluent liquid inside the brewing chamber 2, as for example in the embodiment shown in FIG. 3 (see line 6 exiting pipe heater 5').

According to a possible embodiment, the temperature of one pipe heater 5 is set on a constant value (for example on 92° C.), while the temperature of the second pipe heater 5' is set on at least two different temperature values (for example 90° C. and 97° C.).

It has to be noted that even if in the example an explicit reference has been made to two pipe heaters 5, 5', it can be also applied to an apparatus 1 wherein one heater is a pipe heater and the other heater is a traditional heater.

EXAMPLE 4

The sequence is as follows: a consumer input commands to the controller, via a GUI, a new drink.

The first diluent pump 3 starts injecting the diluent liquid into pipe heater 5, preferably at a flow rate of 2 ml/s. the first pipe heater 5 is powered to set the temperature of the diluent passing therethrough to the constant value of 92° C., preferably with a tolerance of plus minus one degree.

After a pre-determined, programmable amount of time, the second diluent pump 3' is turned on by the controller C, preferably at a flow rate of 6 ml/s.

Then, the second pipe heater 5' is powered by the controller C. The temperature value of the second pipe heater 5' is firstly set at 90° C., for a predetermined amount of time and/or for a predetermined amount of diluent passing therethrough.

Preferably, the first temperature T1 (for example 90° C.) is maintained during most of the cycle. Then, the second pipe heater 5' is powered to set the temperature on another temperature value, preferably higher than the first value, to reduce the amount of froth in the drink and raise the temperature of the finished drink.

Preferably, the second temperature value is 97° C. The second temperature value is maintained for a predetermined amount of time and/or for a predetermined amount of diluent passing through the pipe heater.

Preferably, the temperature of 97° C. is maintained for the last 10 seconds of the beverage preparation cycle.

The first pipe heater 5 is connected to the brewing chamber 2 filled for example with roast and ground coffee, weighing preferably 8 grams, median average grind (50% of distribution) 350 μm and brewed preferably at a maximum pressure of 16 bars. Suitable size dimensions are disclosed e.g. in EP1882432.

The second pipe heaters 5' can be an "open pipe" type of pipe heating assembly, optionally with a self-regulating heating film set to maintain 97° C. continuously at a fixed rate of 6 ml/s. In general, 3500 W are required with a flow rate of 12 ml/sec.

It has to be noted that one pipe heater 5, 5', of said two pipe heaters can be arranged to supply fluid exiting therefrom downstream of the brewing chamber 2, as for example shown in the embodiment of FIG. 2 (and in one embodiment of FIG. 3, see continuous line exiting pipe heater 5'). However, both pipe heaters 5, 5' can be arranged to supply diluent liquid inside the brewing chamber 2, as for example in the embodiment shown in FIG. 3, where line 6 exiting pipe heater 5' and line 8 exiting pipe heater 5 are both connected to the brewing chamber 2.

As already mentioned above in connection to Example 3, the temperature of the two pipe heaters 5, 5' is set on a constant value. In general, it has to be understood that the constant value set for a pipe heater can be different for the constant value set for the other pipe heater.

Additionally, although in the example an explicit reference has been made to two pipe heaters 5, 5', the provided example can be also applied to an apparatus 1 wherein one heater is a pipe heater and the other heater is a traditional heater.

EXAMPLE 5

According to Example 5, the first pipe heater is set on 92° C., while the second pipe heater is set on 80° C.

More in detail, the sequence is as follows: a consumer input commands to the controller, via a GUI, a new drink.

The first diluent pump 3 starts injecting the diluent liquid into pipe heater 5, for example at a flow rate of 2 ml/s. Controller C turns heating of pipe heater 5 on, which is set to maintain 92° C., preferably with a tolerance of plus minus one degree.

After a pre-determined, programmable amount of time, the second pump 3' is turned on by the controller C, for example at a flow rate of 6 ml/s. Then, the second pipe heater 5' heating is turned on by the controller C. There may be no changes in the temperature settings during the cycle of preparation.

The first pipe heater 5 is connected to the brewing chamber 2 filled for example with roast and ground coffee, preferably weighing preferably 8 grams, and brewed preferably at a maximum pressure of 16 bars.

The second pipe heater 5' is a pressurised type pipe heater, connected to a pump 3' capable of supplying diluent at an average pressure of 16 bars. The pipe heater 5' is provided with a heating film which can be set to maintain a constant temperature value, preferably of 80° C., e.g. with a tolerance of plus minus two degrees.

A top i.e. maximum flow rate 12 ml/s can be set.

It has to be noted that one of said two pipe heaters 5, 5' can be arranged to supply fluid exiting therefrom downstream of the brewing chamber 2, as for example shown in the embodiment of FIG. 2 (and in one embodiment of FIG. 3). However, both pipe heaters 5, 5' can be arranged to supply diluent liquid inside the brewing chamber 2, as for example shown in the embodiment of FIG. 3 where line 6 exiting pipe heater 5' and line 8 exiting pipe heater 5 are both connected to the brewing chamber 2.

Additionally, even if in the example an explicit reference has been made to two pipe heaters 5, 5', it can be also applied to an apparatus 1 wherein one heater is a pipe heater and the other heater is a traditional heater.

As mentioned above, according to an aspect of the invention, the beverage preparation apparatus 1 comprises at least two heating means 5, 5' including at least one pipe heater for heating a diluent liquid flowing therethrough.

As shown in the exemplary embodiment of FIG. 4, the heating means 5, 5' comprises two or more heating sections of a pipe heater 5, and in particular three heating sections 80, 80a, 80b in the embodiment shown in FIG. 4.

Preferably, the heating sections 80, 80a, 80b are independently controlled by the controller C.

According to a possible embodiment, as for example shown in FIG. 4a, the two or more heating means 5, 5' of the apparatus can be formed by two or more separate pipe heaters 5, 5'. The two or more separate pipe heaters 5, 5' are preferably arranged in series so that the diluent liquid exiting one pipe heater 5 is directed to the inlet of a second pipe heater 5'.

In other words, the heating means of this embodiment can comprise two or more heating sections of a least one pipe heater, and/or two or more separate pipe heaters, connected in series.

The heating sections 80, 80a, 80b of the pipe heater 5 are independently controlled by the controller C of the beverage preparation apparatus. In other words, the controller C is configured to independently supply power to the two or more heating sections.

As mentioned above, the heating sections of the at least one pipe heater are formed by two or more portion of heating film applied on the surface of the pipe heater. Each portion of heating film is connected to at least one controller C to be independently controlled by supplying power independently to each heating section of the pipe heater.

In fact, each heating section 80, 80*a*, 80*b* of the pipe heater can be controlled, i.e. activated, or deactivated, independently from one or more other heating sections of the pipe heater. Each heating section can be activated (preferably for a desired amount of time) and/or it can be deactivated (preferably for a desired amount of time), independently from one or more other heating sections of the pipe heater.

The same applies to the possible embodiment wherein the heating means 5, 5' are formed by two or more separate pipe heaters, as for example shown in the embodiment of FIG. 4*a*.

According to an aspect of the invention, the controller C is configured to supply power to the at least two heating means 5, 5', including at least one pipe heater, depending on the diluent liquid flow rate passing through the heating means, in order to heat the diluent at a preset temperature required for the beverage preparation.

Said flow-rate may be independently controlled and regulated by the controller C so that the temperature control program of the dispensing apparatus can utilize said flow rate as an additional variable for thermal control of the diluent(s) and of the finished drink. Advantageously, power can be supplied to the heating means, e.g. two or more separate pipe heaters 5, 5' and/or two or more heating sections 80, 80*a*, 80*b* of at least one pipe heaters, to heat the diluent liquid at one or more desired temperature value(s).

Moreover the controller C may modulate the power supply to each of the at least two heating sections 80, 80*a*, 80*b* so that e.g. 100% of the available power is provided for 50% of the total surface of the heating section, or viceversa 50% of the available power is used on 100% of the surface of the heating section, or a combination of the two possible operating ways.

The power supplied to the heating means, and in particular the activation (and/or the deactivation) of one or more of the heating means can be controlled in order to heat the diluent liquid at a desired temperature for any diluent liquid flow rate.

In fact, according to predetermined data, such as for example maps of data relating to the supplied power/time for a determined temperature, the activation of the heating means 5, 5' can be controlled to heat the diluent liquid at desired temperature for any diluent liquid flow rate.

According to a possible embodiment, each heating means is activated, i.e. power is supplied by the controller, to obtain a temperature value of the diluent liquid for a maximum flow rate of the diluent liquid. The controller is operated to reduce the power supplied to the heating means, or to deactivate certain heating means, if the current flow rate value falls below the maximum flow rate value of the diluent liquid. To this purpose the heating means may be deactivated at least for one time.

According to an aspect of the invention, the controller C is operated to reduce the power supplied to said at least one pipe heater or to deactivate said at least one pipe heater, preferably depending on the diluent liquid flow rate passing through the at least one pipe heater. Said flow-rate may be controlled by the controller C and purposefully reduced for improved organoleptic results.

According to an aspect of the invention, the controller is operated to reduce the power supplied to one or more heating sections 80, 80*a*, 80*b* of at least one pipe heater, or to deactivate one or more heating sections of the at least one pipe heater, preferably depending on the diluent liquid flow rate passing through the at least one pipe heater.

The current flow rate value of the diluent liquid can be evaluated by means of the operating point of the pump 3 intended to supply a diluent liquid from the diluent source 4, and/or by means of at least one flow sensor S1.

By doing so, depending on the current flow rate value of the diluent liquid the one or more heating means 5, 5' can be independently controlled to obtain a desired temperature value of the diluent liquid necessary to an optimal preparation of the desired beverage.

It has to be noted that for maximising the quality of the different beverages to be prepared using the beverage preparation apparatus herewith described, different steps of the beverage preparation may be included in the controller C, and said different steps may include different flow-rates of the diluent liquid and the duration of time during these may be used. Therefore, the heating means 5, 5' has to be controlled independently, so as for example to activate only the number of heating sections 80, 80*a*, 80*b*, and/or the number of pipe heaters, necessary to heat the diluent liquid, supplied at the current flow rate, at a desired temperature.

In the beverage preparation apparatus diluent liquid flow rate can be for example modified by operating the pump 3 to supply the diluent liquid from the diluent source 4.

Summarizing, the controller C selectively activates or deactivates the electrically independent heating means as a function of the temperature of the diluent to be fed to the brewing chamber and as a function of the flow rate of the diluent flowing through the heating means; in other words, the invention provides a beverage dispensing apparatus with a controller (C) for independently supplying power to one or all of said heating means as a function of the flow rate and of the temperature of the diluent that are required or, in the case of the flow rate, that are obtained in the beverage preparation step. At least one heating means is a pipe heater.

In particular, in the embodiment above disclosed with reference to FIGS. 4 and 4*a* the following possible methods can be carried out. In both methods the correlation between flow rate and temperature of the diluent obtainable by activation of one, two or more heating means is known and is provided to the controller.

Real Time Control.

During a brewing step the number of activated heating means (e.g. portions of a pipe heater) is set as a function of the flow rate of the diluent to obtain the required temperature at the exit of the last heating means (i.e. a temperature suitable for the brewing of the ingredients).

In case the flow rate changes and falls below (or exceeds) a set value, the number of activated heating means is modified to compensate the change in flow rate. This change can be made in real time, especially if the volume of the beverage to be dispensed is greater than about 40-50 cc.

Pre-Set Control.

The number of activated heating means (i.e. portions of pipe heater or number of pipe heaters) and the flow rate of the diluent are chosen by the controller in view of the volume of diluent to be used to prepare the beverage.

A high volume for the beverage (e.g. 300 cc or more) will result in the use of a high flow rate to reduce the time necessary for preparing the beverage; in such a case a high number of heating means (e.g. all the heating means) will be activated to provide the required temperature for the brewing diluent.

It has to be noted that the pipe heaters used in the apparatus according to the invention, have a considerable energy efficiency when compared to the boilers and heaters used in today's vast majority of house appliances.

This is due to the fact that a greater part of energy can be transferred from the heat-conductive substrate, coating etc. to the diluent, thanks to the limited mass of the pipe itself. This creates unexpected gains in temperature control, with maximum efficiency, and allows for a twin heater system to more accurately control the drink preparation cycles.

The increased efficiency and the consumption reduction may be considered under two aspects:

1. The amount of energy consumed in order to maintain the apparatus always in a ready-to-operate mode, to which prerogative it is associated a number of seconds of start up during which the machine's heating system gets ready for brewing. Typically a current dispensing apparatus such as a capsule coffee-machine will reach the operating temperature (and flow rates in case of pump stop) in about 30 seconds when it is of a "fast" type currently on the market. Instead, a pipe heater requires from fractions of a second to a few seconds in order for the diluent to reach operating temperatures.

Moreover it is needed to know whether the stand-by mode, inherent to a "fast" type of apparatus getting to a "ready to brew" status in a matter of 30", requires energy and how much of it is required to maintain the machine virtually on a "ready" status. Instead, a pipe heater does not require any power supply and its heating cycle may start from a pipe and diluent both at ambient temperature.

2. Secondly, energy may be considered in terms of the amount of energy needed to perform a determined beverage cycle.

By using the apparatus according to the invention the energy needed to maintain the apparatus in a ready to operate mode can be saved. In fact, the apparatus according to the invention, can be maintained in a non-operative mode between one beverage preparation cycle and a subsequent beverage preparation cycle. In fact, the preparation of a new beverage is required, the pipe heater(s) can heat the diluent in a reduced amount of time, even when heating the diluent having a temperature equal to the ambient temperature.

The invention claimed is:

1. A beverage preparation apparatus, comprising:
   a brewing chamber configured to contain at least one ingredient for beverage preparation;
   at least one pump configured to supply a diluent liquid from at least one diluent source to the brewing chamber; and
   at least two heaters configured to heat diluent liquid flowing therethrough, said at least two heaters include at least two distinct pipe heaters which are arranged parallel upstream of the brewing chamber to feed the diluent liquid to the brewing chamber, wherein the at least two heaters including said at least two pipe heaters being are independently controlled by a controller configured to independently supply power to the at least two pipe heaters and to activate the at least two pipe heaters, wherein said pipe heater is a hollow pipe bearing a heating film on an outer surface thereof, and wherein the diluent liquid passing inside said hollow pipe is heated through the heating film and said at least two pipe heaters are provided with temperature sensors which are electrically connected to the controller and are configured to measure a temperature of said diluent liquid exiting from said at least two pipe heaters.

2. The beverage preparation apparatus according to claim 1, wherein the controller is further configured to supply power to the at least two pipe heaters depending on a flow rate of the diluent liquid passing through the at least two pipe heaters.

3. The beverage preparation apparatus according to claim 1, wherein the controller is further configured to set a temperature of diluent liquid exiting the at least two pipe heaters to a temperature value for a maximum flow rate value of the diluent liquid passing therethrough, to reduce the supplied power to the at least two pipe heaters, or to deactivate the at least one two pipe heaters if a current flow rate value is below the maximum flow rate value of the diluent liquid.

4. The beverage preparation apparatus according to claim 1, wherein at least one heater of the at least two pipe heaters is configured to supply vapour to the brewing chamber.

5. The beverage preparation apparatus according to claim 1, wherein the at least one ingredient in the brewing chamber is pre-packaged in a capsule or in a filter pod, and is disposed in the brewing chamber.

6. The beverage preparation apparatus according to claim 1, wherein the at least two pipe heaters is of a closed type or of an open type.

7. The beverage preparation apparatus according to claim 1, wherein the at least two pipe heaters is of a self-regulating type.

8. A beverage preparation apparatus according to claim 1, wherein the at least one of the two distinct pipe heaters comprises two or more heating sections independently controlled one to another by the controller.

* * * * *